Sept. 23, 1947.  H. B. MUELLER  2,427,803
ADJUSTABLE NOSE FOR HAND TRUCKS
Filed Nov. 19, 1945
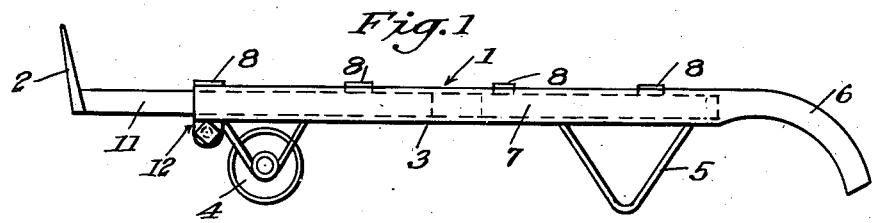
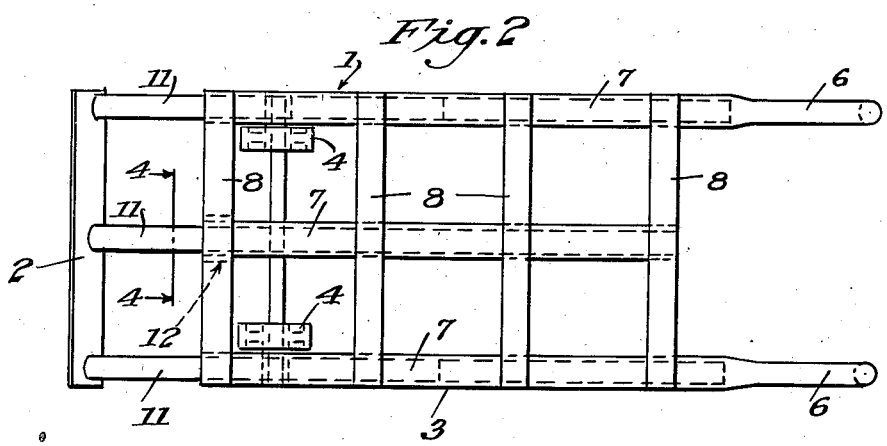
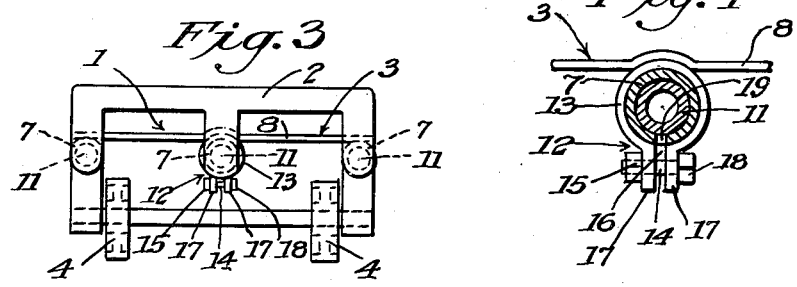 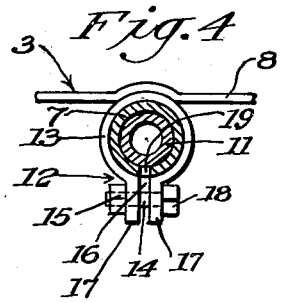
INVENTOR:
Herbert B. Mueller,
BY Alan Franklin,
ATTORNEY.

under Sept. 23, 1947

UNITED STATES PATENT OFFICE 2,427,803

ADJUSTABLE NOSE FOR HAND TRUCKS

Herbert B. Mueller, Los Angeles, Calif.

Application November 19, 1945, Serial No. 629,509

1 Claim. (Cl. 280—57)

This invention relates to hand trucks and more particularly to an adjustable nose for a hand truck.

The general object of the invention is to provide an adjustable nose on the forward end of a hand truck for enabling the forward end of the truck to be projected under heavy and bulky objects for balancing such objects on the truck.

Other objects and advantages will appear hereinafter as this specification progresses.

The invention is illustrated in the annexed drawing which forms a part of this specification, and in which:

Fig. 1 is a side elevation of a hand truck embodying my invention.

Fig. 2 is a plan view of the hand truck shown in Fig. 1.

Fig. 3 is a front end elevation of the truck shown in Figs. 1 and 2.

Fig. 4 is a cross section of a part of said truck taken on line 4—4 of Fig. 2.

Referring more particularly to the drawing, in which the same parts are designated by the same reference numerals in all of the figures, 1 indicates a hand truck on the forward end of which is mounted an adjustable nose plate 2, which constitutes my invention.

The truck 1 includes a frame 3, wheels 4 on which the forward end of said truck is mounted, legs 5 secured to the rear end of said frame for supporting said end of said truck in its lowered position, and a pair of handles 6 on the rear of said frame for operating the truck. The truck frame 3 comprises three tubular longitudinal rails 7 spaced transversely of the frame, and a plurality of transverse slats 8, all of which except one being secured to the upper side of all three of said longitudinal rails in spaced relation longitudinally of the frame 3, and one of said transverse slats 8 being secured to the forward ends of the all three of longitudinal rails 7, and another of said transverse slats being secured to the rear ends of all three of said longitudinal rails. The handles 6 are formed on the rear ends of the outer longitudinal side rails 7, respectively, of the truck frame 3.

The adjustable nose plate 2 is secured to the forward ends of three longitudinal tubular struts 11 spaced transversely apart and extending rearwardly from said nose plate and telescoping in the longitudinal tubular rails 7 of the truck frame 3 through the forward ends of said tubular rails.

A clamp 12 is provided on the forward end of the intermediate longitudinal tubular frame rail 7 for clamping the intermediate longitudinal tubular strut 11 extending rearwardly from the nose plate 2, in different positions, whereby said nose plate is secured in various positions to which it may be adjusted forwardly of the forward end of the truck frame 3. Said clamp 12 may comprise a split band 13, a bolt 14, and a nut 15 threaded on the end of said bolt, which band 13 is split at its lower side at 16 and is bent downwardly at its ends into a pair of eyes 17, through which eyes is extended said bolt 14, with the head 18 of said bolt engaging one of said eyes and said nut 15 threaded on the end of said bolt against the other eye 17, the tubular rail 7 being split at its under side at 19 opposite the split 16 in the band 13 between said eyes 17, to permit contraction and expansion of said intermediate tubular frame rail 7 around said telescoping longitudinal strut 11, extending rearwardly from the nose plate 2, as the nut 15 on the clamp bolt 14 is tightened against an eye 17 of the clamp 12 or loosened with relation to said eye. The rail 7, clamp band 13, and forward end slat 8 are secured together in any suitable manner, preferably by welding the same together.

The operation of my invention is as follows:

The nose plate 2 is extended forwardly of the truck frame 3 to a suitable distance according to the size of the object to be carried by the truck, and said nose plate is clamped in said position by the clamp 12 which clamps the end of the tubular frame rail 7 around the intermediate telescoping tubular strut 11 extending rearwardly from the nose plate 2. The handles 6 of the truck 1 being grasped by the operator, the truck is pushed forwardly until the nose plate 2 is projected the proper distance under an object which is tilted upwardly to receive said nose plate. The object is then lowered at its raised side upon the frame 3 of the truck in a balanced position on the truck for moving the object from one place to another on the truck.

I claim:

In a hand truck, a truck frame formed with longitudinal tubular rails, a nose member formed with a transverse nose plate and with longitudinal struts extending rearwardly from said nose plate and telescoped in said longitudinal tubular frame rails through the forward ends thereof, the forward end of one of said tubular rails being split longitudinally, a split band clamp surrounding said forward end of said split tubular rail and formed with eyes at its ends, respectively, and a bolt extended through said eyes for drawing the ends of said band clamp and the edges of said tubular rail at the split therein together and clamping the strut in said split rail for adjustably securing said nose member in extended or retracted positions with relation to the forward end of the truck.

HERBERT B. MUELLER.

REFERENCES CITED

The following references are of record in the file of this patent:

UNITED STATES PATENTS

| Number | Name | Date |
|---|---|---|
| 552,696 | O'Neill | Jan. 7, 1896 |